(12) United States Patent
Simonsen et al.

(10) Patent No.: US 10,970,369 B2
(45) Date of Patent: Apr. 6, 2021

(54) RAPID FILE AUTHENTICATION ON AUTOMATION DEVICES

(71) Applicant: Rockwell Automation Technologies, Inc., Mayfield Heights, OH (US)

(72) Inventors: Warren A. Simonsen, Menomonee Falls, WI (US); Scott D. Braun, Menomonee Falls, WI (US); Alex L. Nicoll, Brookfield, WI (US); James B. Vitrano, South Milwaukee, WI (US); James S. Rustad, Jackson, WI (US); Daniel J. Middlestetter, Lyndhurst, OH (US)

(73) Assignee: Rockwell Automation Technologies, Inc., Mayfield Hts., OH (US)

( * ) Notice: Subject to any disclaimer, the term of this patent is extended or adjusted under 35 U.S.C. 154(b) by 202 days.

(21) Appl. No.: 16/220,787

(22) Filed: Dec. 14, 2018

(65) Prior Publication Data

US 2020/0193000 A1 Jun. 18, 2020

(51) Int. Cl.
  *G06F 21/12* (2013.01)
  *G06F 21/44* (2013.01)
  (Continued)

(52) U.S. Cl.
  CPC ....... *G06F 21/121* (2013.01); *G05B 19/0426* (2013.01); *G05B 19/0428* (2013.01);
  (Continued)

(58) Field of Classification Search
  CPC ... G06F 21/121; G06F 21/44; G05B 19/0426; G05B 19/0428; G05B 19/056; H04L 9/3242
  See application file for complete search history.

(56) References Cited

U.S. PATENT DOCUMENTS

2014/0281536 A1* 9/2014 Livolsi ............... H04L 9/14
                                                     713/168
2016/0112374 A1* 4/2016 Branca ............ H04L 63/0263
                                                        726/1
(Continued)

FOREIGN PATENT DOCUMENTS

EP   1 582 950 A1   10/2005
EP   2 402 879 A1   1/2012
(Continued)

OTHER PUBLICATIONS

Extended European Search Report received for European Patent Application Serial No. 19215761.8 dated Apr. 30, 2020, 08 pages.
(Continued)

*Primary Examiner* — Malcolm Cribbs
*Assistant Examiner* — Stephanie S Ham
(74) *Attorney, Agent, or Firm* — Amin, Turocy & Watson, LLP

(57) ABSTRACT

An industrial device is configured to implement a lightweight file authentication sequence that rapidly verifies the integrity of mobile code supplied to the industrial device. The industrial device generates a file authentication code (FAC), which is stored on the industrial device and only made accessible to users via a local connection to the industrial device. The device-specific file FAC is installed on the program development application used to develop or edit the mobile code to be executed on the industrial device. The development application provides the mobile code to the industrial device together with a hash-based message authentication code (HMAC) generated using a retrieved copy of the FAC. The industrial device only permits execution of the mobile code if the HMAC included with the mobile code matches a locally created HMAC generated by
(Continued)

the industrial device based on the mobile code and the device's local copy of the FAC.

20 Claims, 11 Drawing Sheets

(51) Int. Cl.
  *H04L 9/32* (2006.01)
  *G05B 19/042* (2006.01)
  *G05B 19/05* (2006.01)

(52) U.S. Cl.
  CPC .......... *G05B 19/056* (2013.01); *G06F 21/44* (2013.01); *H04L 9/3242* (2013.01); *G05B 2219/13187* (2013.01); *G05B 2219/24155* (2013.01); *G05B 2219/24167* (2013.01)

(56) References Cited

U.S. PATENT DOCUMENTS

2017/0103647 A1* 4/2017 Davis ................ H04W 12/0802
2018/0373900 A1* 12/2018 Barlow ................... G06F 21/78

FOREIGN PATENT DOCUMENTS

WO     2013/147732 A1   10/2013
WO     WO-2013147732 A1 * 10/2013 ............. G06F 21/72

OTHER PUBLICATIONS

Communication pursuant to Rule 69 EPC received for European Patent Application Serial No. 19215761.8 dated Jun. 22, 2020, 02 pages.

* cited by examiner

RAPID FILE AUTHENTICATION ON AUTOMATION DEVICES

BACKGROUND

The subject matter disclosed herein relates generally to industrial automation systems, and, more particularly, to techniques for ensuring integrity of mobile code installed in industrial devices.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an industrial device is provided, comprising a program execution component configured to execute mobile code, wherein execution of the mobile code facilitates at least one of monitor or control of an industrial process by the industrial device; a file authentication code (FAC) generation component configured to generate an FAC that is specific to the industrial device; a client interface component configured to receive a request for a copy of the FAC from a client device, in response to determining that the request is received via at least one of a local data port or a local memory port of the industrial device, send the copy of the FAC to the client device, and in response to determining that the request is received via a networking port of the industrial device, deny the request for the copy of the FAC; an HMAC generation component configured to generate a first hash-based message authentication code (HMAC) based on the FAC and content of received mobile code received via the client interface component; and a file authentication component configured to prevent execution of the received mobile code by the program execution component in response to at least one of a determination that a second HMAC bundled with the received mobile code does not match the first HMAC or a determination that the received mobile code does not include the second HMAC.

Also, according to one or more embodiments, a method for preventing execution of malicious code on an industrial device is provided, comprising generating, by an industrial device comprising a processor, a file authentication code (FAC) that is unique to the industrial device; receiving, by the industrial device, a request for a copy of the FAC from a client device; in response to the receiving the request, sending, by the industrial device, a copy of the FAC to the client device conditional on a determination that the request is received via at least one of a local data port or a local memory port of the industrial device; receiving, by the industrial device, mobile code from the client device or another client device; in response to the receiving the mobile code, generating, by the industrial device, a first hash-based message authentication code (HMAC) based on the FAC and content of the mobile code; and in response to determining that a second HMAC received with the mobile code does not correspond to the first HMAC or that the mobile code was received without the second HMAC, preventing, by the industrial device, execution of the mobile code on the industrial device.

Also, a non-transitory computer-readable medium is provided having stored thereon executable instructions that, in response to execution, cause an industrial device comprising at least one processor to perform operations, the operations comprising generating a file authentication code (FAC) that is specific to the industrial device; in response to determining that the request is received via at least one of a local data port or a local memory port of the industrial device, sending the copy of the FAC to the client device; receiving mobile code from the client device or another client device; in response to the receiving the mobile code, generating a first hash-based message authentication code (HMAC) based on the FAC and content of the mobile code; and in response to determining that a second HMAC included with the mobile code is not equal to the first HMAC or that the mobile code was received without the second HMAC, disabling execution of the mobile code on the industrial device.

To the accomplishment of the foregoing and related ends, certain illustrative aspects are described herein in connection with the following description and the annexed drawings. These aspects are indicative of various ways which the subject disclosure can be practiced, all of which are intended to be covered herein. Other advantages and novel features may become apparent from the following detailed description when considered in conjunction with the drawings.

DETAILED DESCRIPTION

Figure 1:
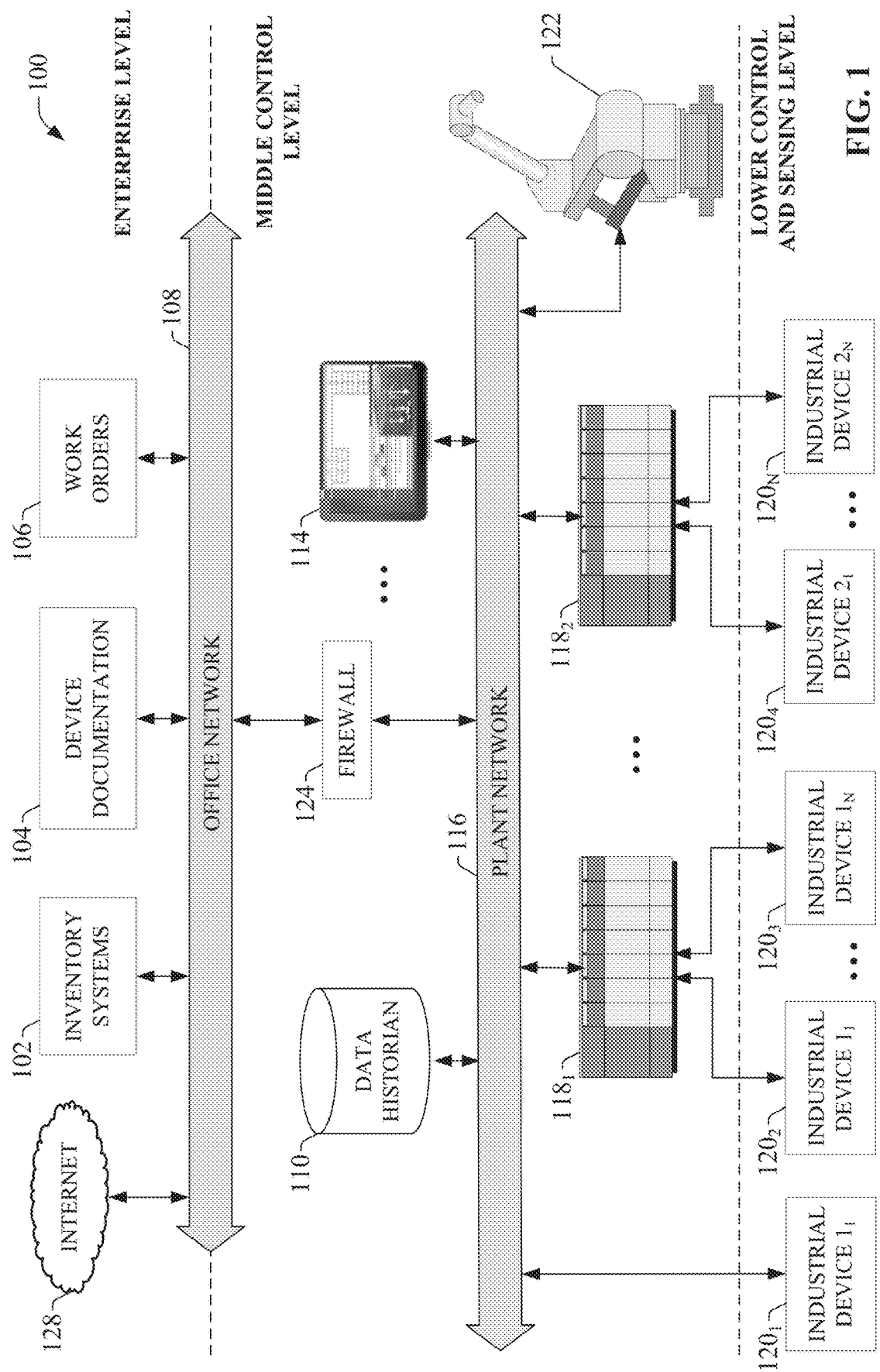
FIG. 1 is a diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," and "interface" are intended to refer to a computer-related entity or an entity related to, or that is part of, an operational apparatus with one or more specific functionalities, wherein such entities can be either hardware, a combination of hardware and software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives, an object, an executable, a thread of execution, a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, where the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100, including a number of diverse industrial devices and assets. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text. Industrial controller functionality can also be embodied on devices other than industrial controllers 118. For example, industrial controller simulators (or PLC simulators) can be executed on motor drives or other types of industrial devices. These industrial controller simulators can execute industrial control programming on their host devices, thereby supplementing the native functionality of those devices with additional control capability typically carried out by industrial controllers 118.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 (e.g., industrial devices $120_2$-$120_N$) to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane—e.g., a backplane installed in the back of the controller's chassis, which serves as a power and data bus between the I/O modules and the controller—such that the digital and analog signals can be read into and controlled by the control programs. Industrial controllers 118 can also communicate with industrial devices 120—e.g., industrial device $120_1$—over a network using, for example, a communication module or an integrated networking port. Exemplary networks can include the Internet, intranets, Ethernet, DeviceNet, ControlNet, EtherNet/IP, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Other industrial devices or assets can include industrial robots 122, which may operate in accordance with programs executed by their own internal controllers, in conjunction with information exchanged with one or more external controllers (e.g., industrial controllers 118). Some industrial environments may also include a number of sub-systems that perform various production, quality, or safety functions, including but not limited to vision systems, safety systems (e.g., optical presence sensing systems, safety relay systems, etc.), product quality check systems (e.g., leak test systems), or other such assets.

Some industrial environments may also include one or more data historians 110 that aggregate and store production information collected from the industrial controllers 118 or other data sources, or a device documentation store 104 containing electronic documentation for the various industrial devices making up the controlled industrial systems. Other industrial devices or assets may include inventory tracking systems 102, work order management systems 106, enterprise resource planning (ERP) systems, manufacturing execution systems (MES), or other such business-level systems, some or all of which may reside on an office network 108 of the industrial environment (e.g., a separately managed network relative to plant network 116). The industrial network environment may also include a number of network architecture devices—such as firewalls 124, hubs, routers, or switches—that connect separate networks and/or networked devices and manage data flow between the various devices and networks. Plant network 116 and office network 108 may conform to respective two different networking protocols, or may conform to a common networking protocol. One or both of plant network 116 or office network 108 may interface with external networks such as the internet 128.

The program files executed on industrial controllers 118 and certain other types of industrial devices are forms of mobile code, or files created on one device (typically a program developer's mobile or desktop computer) and executed on another device (the industrial controller or other industrial device). Execution of user-developed mobile code on industrial devices represents a potential avenue for malicious attacks on an industrial control system, since unauthorized people or devices may attempt to install executable files designed to compromise the integrity or behavior of the industrial device or the automation system within which the device operates. Potentially, such attackers could access the industrial device either locally or remotely (e.g., via the internet over office network 108 and/or plant network 116) and replace the existing program file executing on the industrial device with a malicious program file.

To address these and other issues, one or more embodiments of the present disclosure provide industrial devices that implement a lightweight file authentication sequence that rapidly verifies the integrity of mobile code supplied to the industrial device, thereby limiting the ability of an attacker to substitute a compromised file. In one or more embodiments, the industrial device can generate a file authentication code, which is stored on the industrial device and made accessible to users only via a local connection to the industrial device. This reduces the risk that the file authentication code can be retrieved by malicious parties since the user must be physically present at the device in order to obtain the code. The user can install the retrieved file authentication code on the program development application used to develop or edit the mobile code to be executed on the industrial device.

Upon completion of program development or editing, the program development application generates a hash-based message authentication code using the file authentication code and contents of the mobile code that was created or edited. The mobile code (e.g., a program file) and the hash-based message authentication code are both provided to the industrial device when the mobile code is downloaded to the device. Before allowing execution of the newly installed mobile code, the industrial device calculates a new hash-based message authentication code using the content of the mobile code and its own locally stored copy of the file authentication code and verifies that the new hash-based message authentication code matches that provided with the mobile code. If the two codes match, the industrial device will execute the mobile code. If the codes do not match, the mobile code is rejected by the device.

This technique is less resource intensive relative to other authentication procedures such as public key infrastructure (PKI) techniques, while still affording a high degree of protection by virtue of the limitations placed on distribution of the file authentication code. The rapid file authentication technique described herein can be implemented on substantially any type of industrial device that receives and executes mobile code, including but not limited to industrial controllers, motor drives, HMI terminals, or other such devices.

Figure 2:
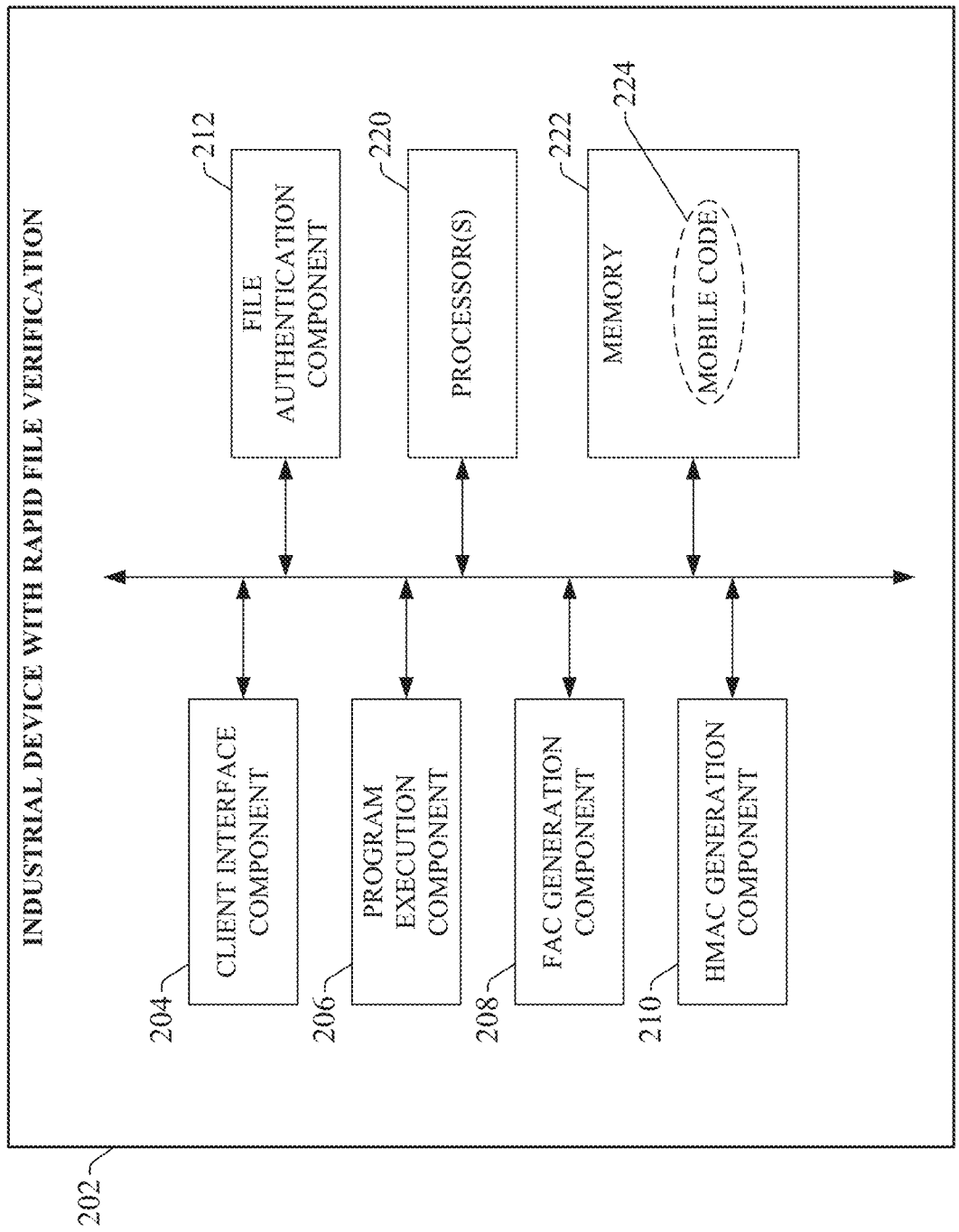
FIG. 2 is a block diagram of an example industrial device that supports rapid file verification.

FIG. 2 is a block diagram of an example industrial device 202 that supports rapid file verification. As noted above, industrial device may be an industrial controller, a motor drive, an industrial device (e.g., a motor drive) that executes an industrial controller simulator, an HMI terminal, or another type of industrial device that receives and execute mobile code (e.g., program files, configuration files, etc.). Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial device 202 can include a client interface component 204, a program execution component 206, an FAC generation component 208, an HMAC generation component 210, a file authentication component 212, one or more processors 220, and memory 222. In various embodiments, one or more of the client interface component 204, program execution component 206, FAC generation component 208, HMAC generation component 210, file authentication component 212, the one or more processors 220, and memory 222 can be electrically and/or communicatively coupled to one another to perform one or more of the functions of the industrial device 202. In some embodiments, components 204, 206, 208, 210, and 212 can comprise software instructions stored on memory 222 and executed by processor(s) 220. Industrial device 202 may also interact with other hardware and/or software components not depicted in FIG. 2. For example, processor(s) 220 may interact with one or more external user interface devices, such as a keyboard, a mouse, a display monitor, a touchscreen, or other such interface devices.

Client interface component 204 can be configured to exchange data with a client device interfaced with the industrial device 202, such as a desktop, laptop, or tablet computer; a mobile device such as a smart phone; or other such client device. Connectivity between the client interface component 204 and the client device can allow program files (or other types of mobile code) to be transferred or downloaded from the client device to the industrial device 202. The client interface component 204 can also regulate distribution of file authentication codes generated by the FAC generation component 208 by only permitting such codes to be delivered to client devices via a direct local hardwired connection to the industrial device 202.

Program execution component 206 can be configured to execute mobile code 224 (e.g., a program file such as a ladder logic program, a sequential function chart program, etc.; an HMI application file; a configuration file; etc.) stored on the industrial device's memory 222 to facilitate monitoring and/or control of an industrial process. FAC generation component 208 can be configured to generate a file authentication code (FAC) to be used to authenticate the mobile code 224 prior to allowing execution. HMAC generation component 210 can be configured to generate a hash-based message authentication code (HMAC) from the contents of a received mobile code 224 and the FAC. File authentication component 212 can be configured to determine the authenticity of the mobile code 224 based on a comparison of the HMAC received with the mobile code 224 and the HMAC computed by the HMAC generation component 210, and either permit or prevent execution of the mobile code 224 by the program execution component 206 based on the determination.

The one or more processors 220 can perform one or more of the functions described herein with reference to the systems and/or methods disclosed. Memory 222 can be a computer-readable storage medium storing computer-executable instructions and/or information for performing the functions described herein with reference to the systems and/or methods disclosed.

Figure 3:
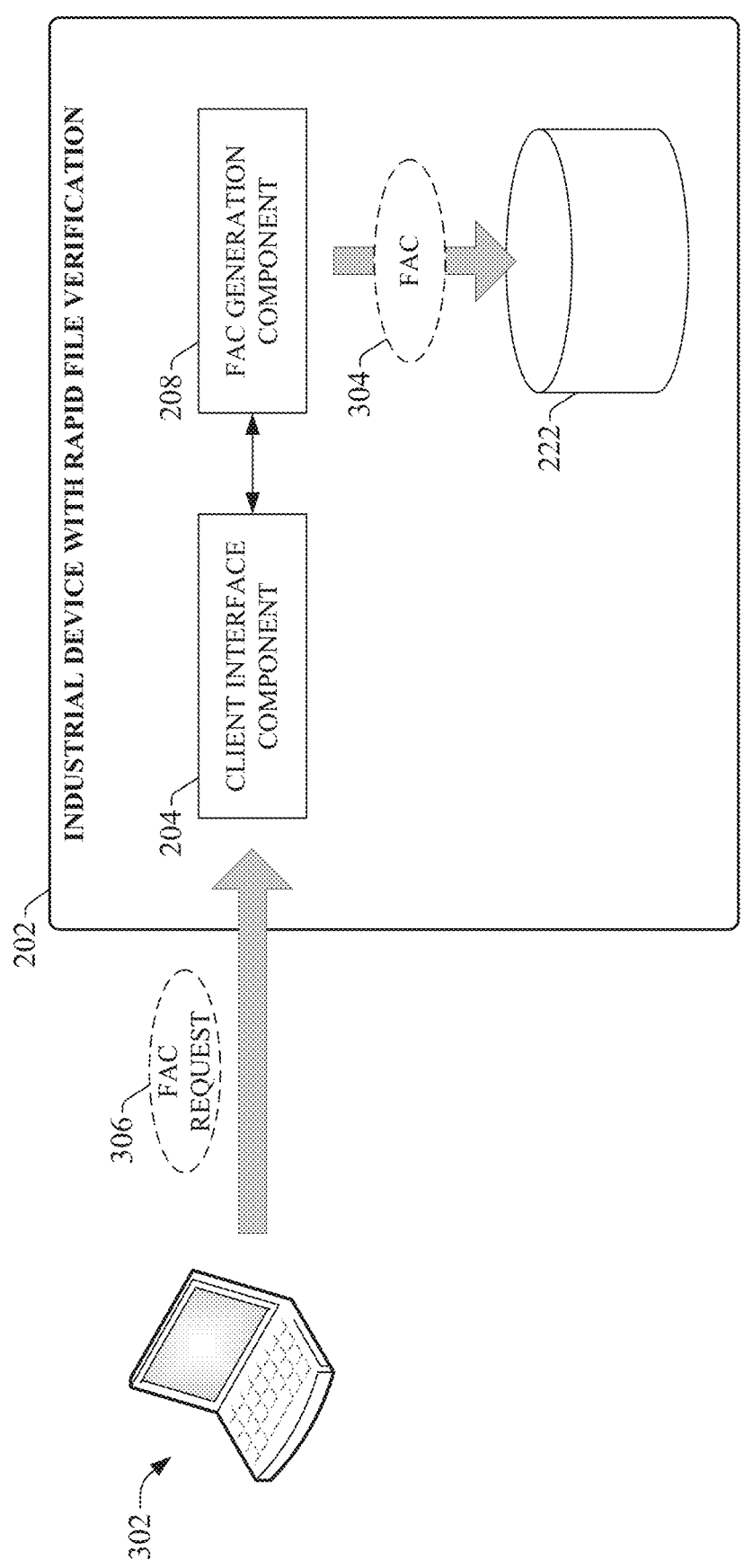
FIG. 3 is a diagram illustrating generation of a file authentication code (FAC) on an industrial device supporting rapid file verification.

FIG. 3 is a diagram illustrating generation of a file authentication code (FAC) 304 on an industrial device 202 supporting rapid file verification. The FAC 304 can be, for example, a numeric, alphabetical, or alphanumeric code generated by the FAC generation component 208 to be unique to the industrial device 202. Any suitable technique can be employed by the FAC generation component 208 to generate the FAC 304, including but not limited to a purely random code generation technique, generation of the FAC 304 based on a unique identifier associated with the industrial device 202 (e.g., the device's media access control (MAC) address or another unique identifier), generation of the FAC 304 based in part on a password provided by the user as part of the FAC request 306, or other suitable techniques.

In one or more embodiments, FAC generation component 208 is configured to generate an FAC 304 in response to receipt of an FAC request 306 from an external device 302 directly connected to the industrial device 202 via a local hardwired or point-to-point connection. To this end, client interface component 204 can be configured to pass FAC requests 306 to the FAC generation component 208 only if such requests are received via one of the industrial device's local communication ports or memory slots. Permitted local communication ports from which FAC requests 306 can be received include, but are not limited to, universal serial bus (USB) ports, serial ports, controller area network (CAN) bus interfaces, local memory slots, or other such local ports. Devices 302 that can initiate generation of an FAC 304 can include, but are not limited to, locally connected HMI terminals, laptop computers, tablet computers, mobile phones, or other such devices. In some embodiments, FAC creation can also be initiated in response to insertion of a memory device (e.g., a flash memory device or a memory card) into a memory slot or data port on the industrial device 202. To prevent generation of an FAC 304 in response to remote requests from malicious parties, client interface component 204 can be configured to reject FAC requests 306 that are received from any of the industrial device's network ports (e.g., ethernet ports). The resulting FAC 304 is stored on the industrial device's local memory 222. In some embodiments, FAC generation component 208 may require entry of a valid password or another user verification credential (e.g., a biometric identifier) as part of the FAC request 306 before permitting the FAC 208 to be generated.

Figure 4:
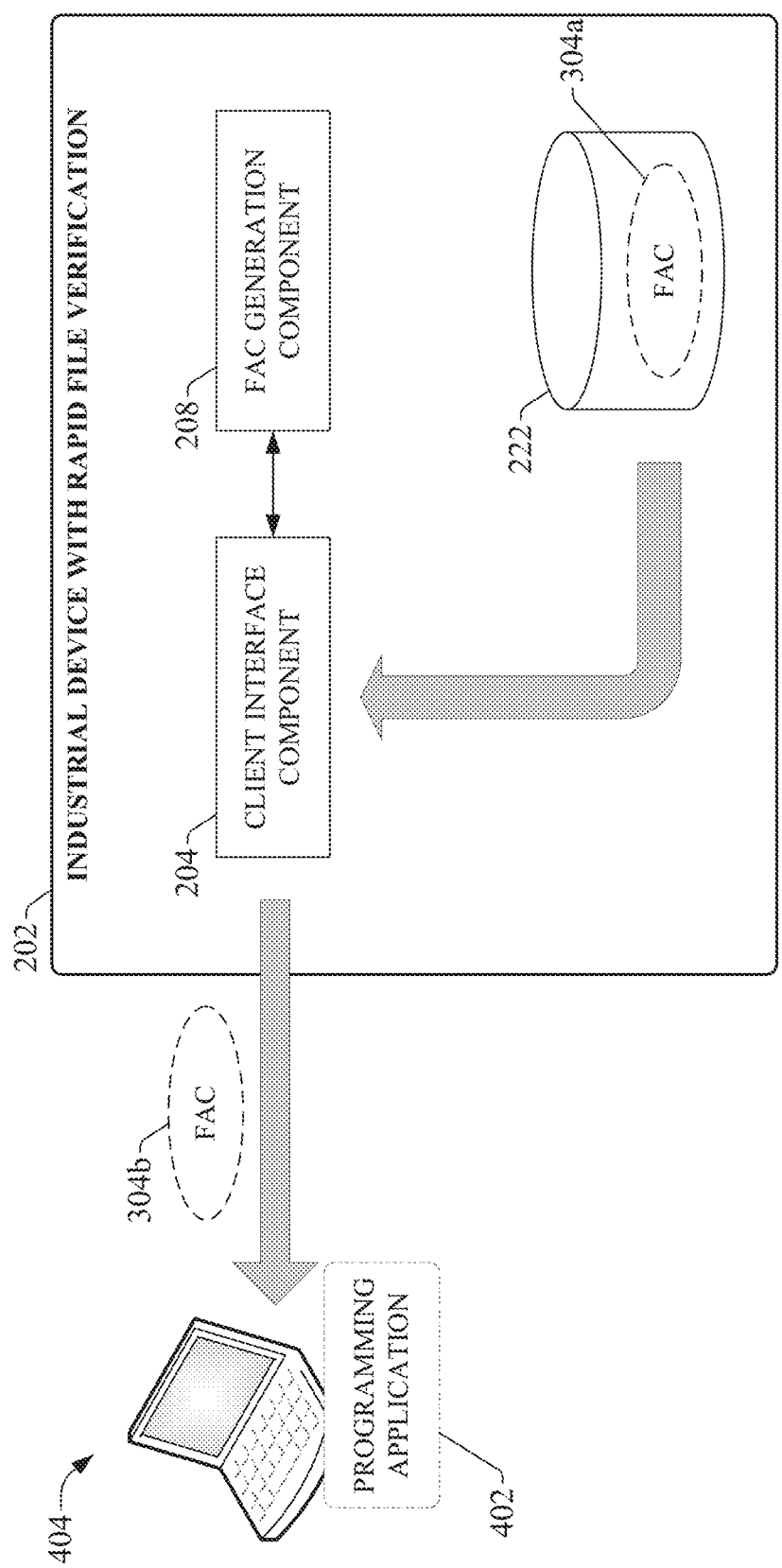
FIG. 4 is a diagram illustrating provision of the FAC to a client device.

If a new or edited program file is to be created and downloaded to the industrial device 202, a copy of the device-specific FAC 304 must be conveyed to the programming application on which the new program file will be developed. FIG. 4 is a diagram illustrating provision of the FAC 304 to a client device 404. As with receipt of FAC requests 306, client interface component 204 will only provision copies of the FAC 304 via a direct local connection to the industrial device 202 (e.g., via the device's USB port, local memory card slot, serial port, etc.) and will deny requests for the FAC 304 received via the industrial device's network ports. This reduces the risk that the FAC 304 will be obtained by unauthorized personnel or distributed outside the plant facility, since a user must be physically present at the industrial device 202 in order to obtain a copy of the FAC 304. Preventing remote access to the stored FAC 304 via the industrial device's network ports also reduces the risk of an outside party modifying or otherwise compromising the FAC 304.

In some embodiments, to provide yet another layer of security, client interface component 204 may be configured to provision of the copy of the FAC 304 only to locally connected client devices 404 that provide verifiable user credentials, indicating that the owner of the client device 404 is authorized to program the industrial device 202. In such embodiments, client interface component 204 may generate a prompt on client device 404 requesting a user credential (e.g., a user name and password), and will only send a copy of the FAC 304 to the client device 404 if the FAC request 306 is received via a local data or memory port, and if the user credential corresponds to a predefined verified credential.

In the illustrated example, the mobile code is a program file to be developed or edited on a programming application 402 installed on client device 404. If the industrial device 202 is an industrial controller such as a PLC, a device running a PLC simulator, or a similar device, programming application 402 may be a ladder logic development platform used to create ladder logic programs (or an industrial control program of another format) as well to set the controller's communication settings, I/O settings, and other configuration aspects. If industrial device 202 is an HMI terminal, programming application 402 may be an HMI development platform used to create the graphical interface displays and underlying animation that will be rendered on the HMI terminal. In general, programming application 402 can be any type of software development platform used to generate mobile code for an industrial device.

Figure 5:
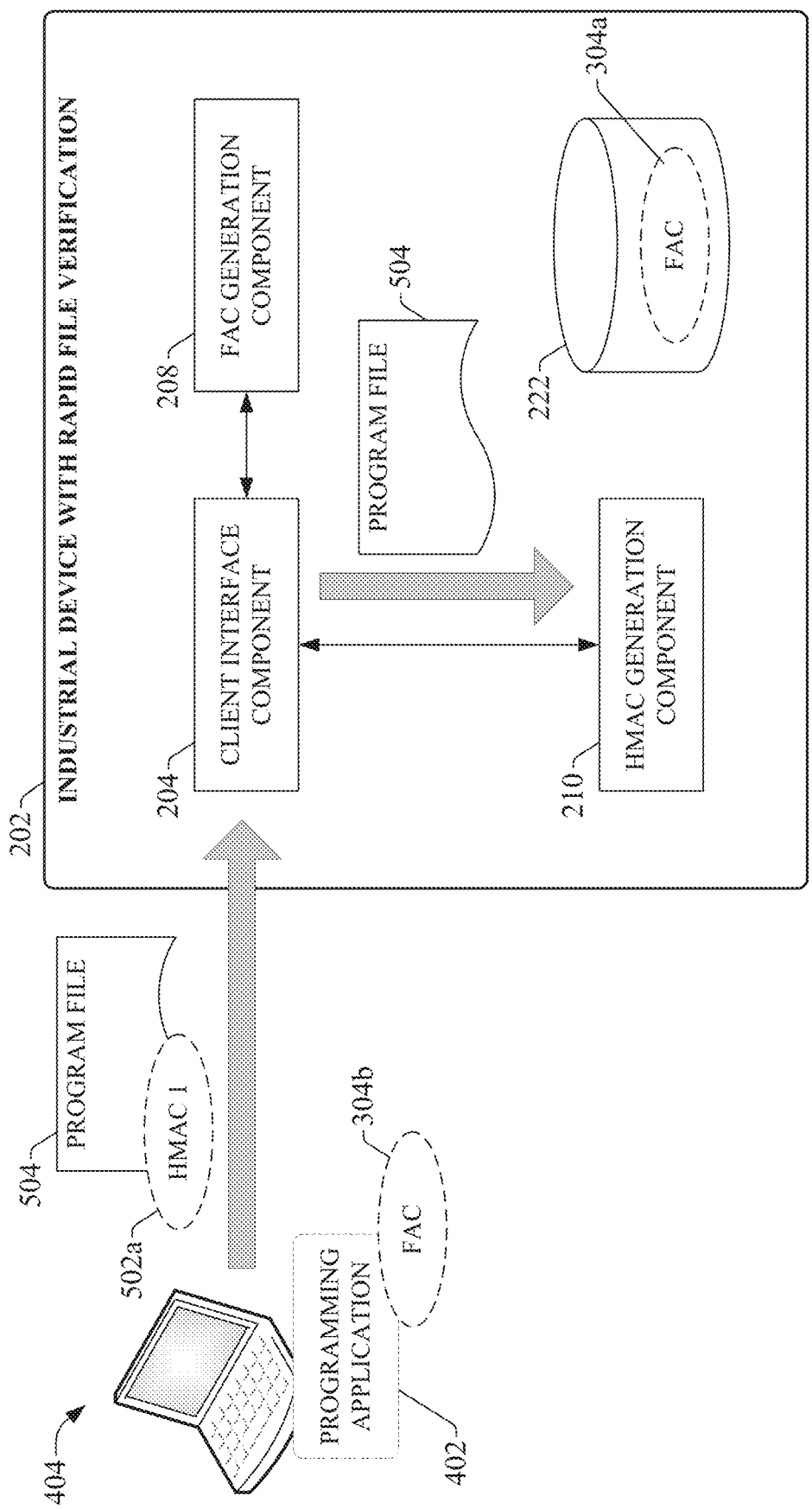
FIG. 5 is a diagram illustrating transfer of a program file to an industrial device.

To comply with the security requirements of industrial device 202, programming application 402 must be provided with a copy of FAC 304 (e.g., FAC 304b, which is a copy of the FAC 304a stored on the industrial device's local memory 222). Possession of the copy of the FAC 304b permits program files developed or edited using programming application 402 to be executed on the industrial device 202. Programming application 402 is compliant with the security features of industrial device 202, and as such includes a security tool that leverages the copy of the FAC 304b to create authentication credentials for the resulting program file. FIG. 5 is a diagram illustrating transfer of a program file 504 to industrial device 202. In this example, the owner of client device 404 has created or edited a program file 504 or another type of executable file or mobile code using programming application 402 for execution on industrial device 202. When the program file 504 is saved on the programming application 402, and prior to download of the program file 504 to the industrial device 202, an integrated security tool of programming application 402 generates a hash-based message authentication code (HMAC) 502a based on the copy of the FAC 304b obtained from the industrial device 202 and contents of the program file 504.

Figure 6:
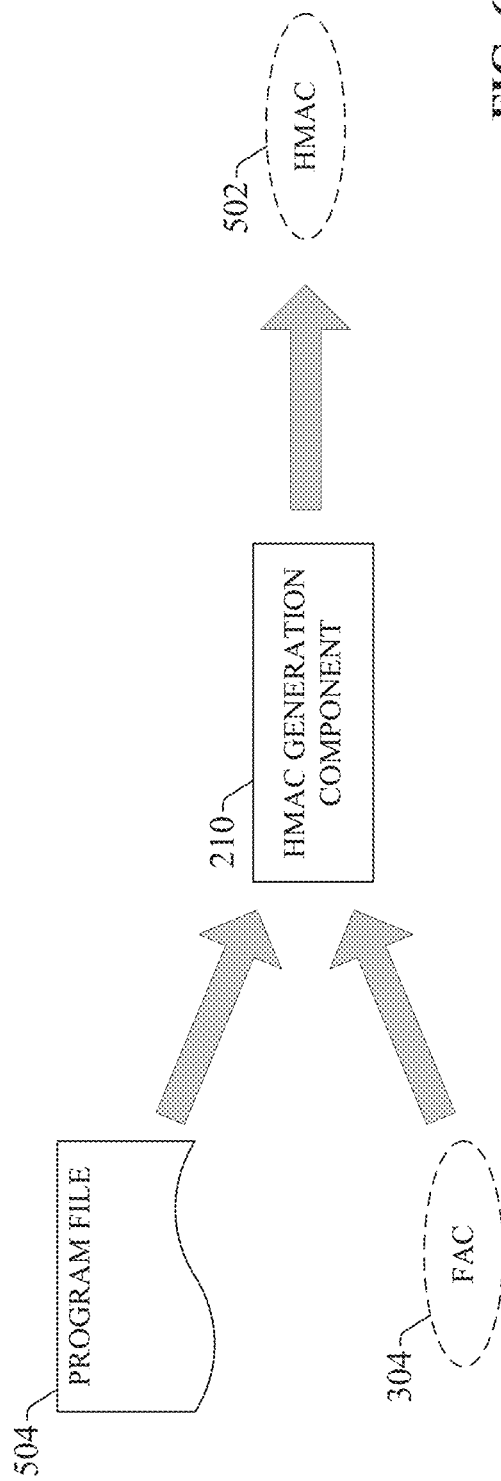
FIG. 6 is a diagram illustrating creation of an HMAC using an HMAC generation component.

FIG. 6 is a diagram illustrating creation of an HMAC 502 using an HMAC generation component 210. Both the industrial device 202 and compatible programming applications 402 can include an HMAC generation component 210 configured to generate an HMAC 502 that is unique for a given pairing of a program file 504 and an FAC 304. The HMAC generating algorithm implemented by the HMAC generation components 210 ensure that the same HMAC 502 will be generated for a given combination of FAC 304 and program file 504 even if generated at different times and on different devices. HMAC generation component 210 can use any suitable technique for generating the HMAC 502. For example, HMAC generation component 210 may use a cryptographic hash function to compute a hash value based on contents of the program file 504, and combine this hash value with the FAC 304 using any suitable aggregation technique to yield HMAC 502.

Returning to FIG. 5, when client device 404 downloads program file 504 to the industrial device 202 (via a connection to the device's client interface component 204), the HMAC 502a generated by the programming application 402 (labeled HMAC 1 in FIG. 5) is bundled and downloaded with the program file 504. The HMAC 502a included with the program file 504 serves as a credential that proves to industrial device 202 that program file 504 was developed on a client device 404 in possession of a copy of FAC 304b.

To add an additional layer of security, some embodiments of programming application 402 may be configured to generate the HMAC 502a only if a valid password or another type of security credential (e.g., a biometric identifier) is received from the user. In some such embodiments, the security credential required by the programming application to facilitate generation of the HMAC 502a may be the same security credential provided to the industrial device 202 when the FAC 304 was generated.

In some embodiments, client interface component 204 may not impose restrictions on the communication paths via which program file 504 and HMAC 502a can be received. That is, whereas access to the industrial device's locally stored FAC 304a is only permitted via a local connection to industrial device 202, and is denied via a network connection, program file 504 and HMAC 502a may be downloaded to industrial device 202 via both local and networked connections in some embodiments. This allows authorized users to download program file 504 from a remote location if desired. Remote transfer of program file 504 to industrial device 202 is permitted in such embodiments since the industrial device 202 will not execute the program file 504 if the HMAC 502a cannot be verified, and so malicious code downloaded from remote locations will be identified and rejected by the industrial device 202. Alternatively, in some embodiments, client interface component 204 may only permit program file 504 and HMAC 502a to be transferred to industrial device 202 over a direct local connection, using limitations similar to those imposed on access to the FAC 304a.

Figure 7:
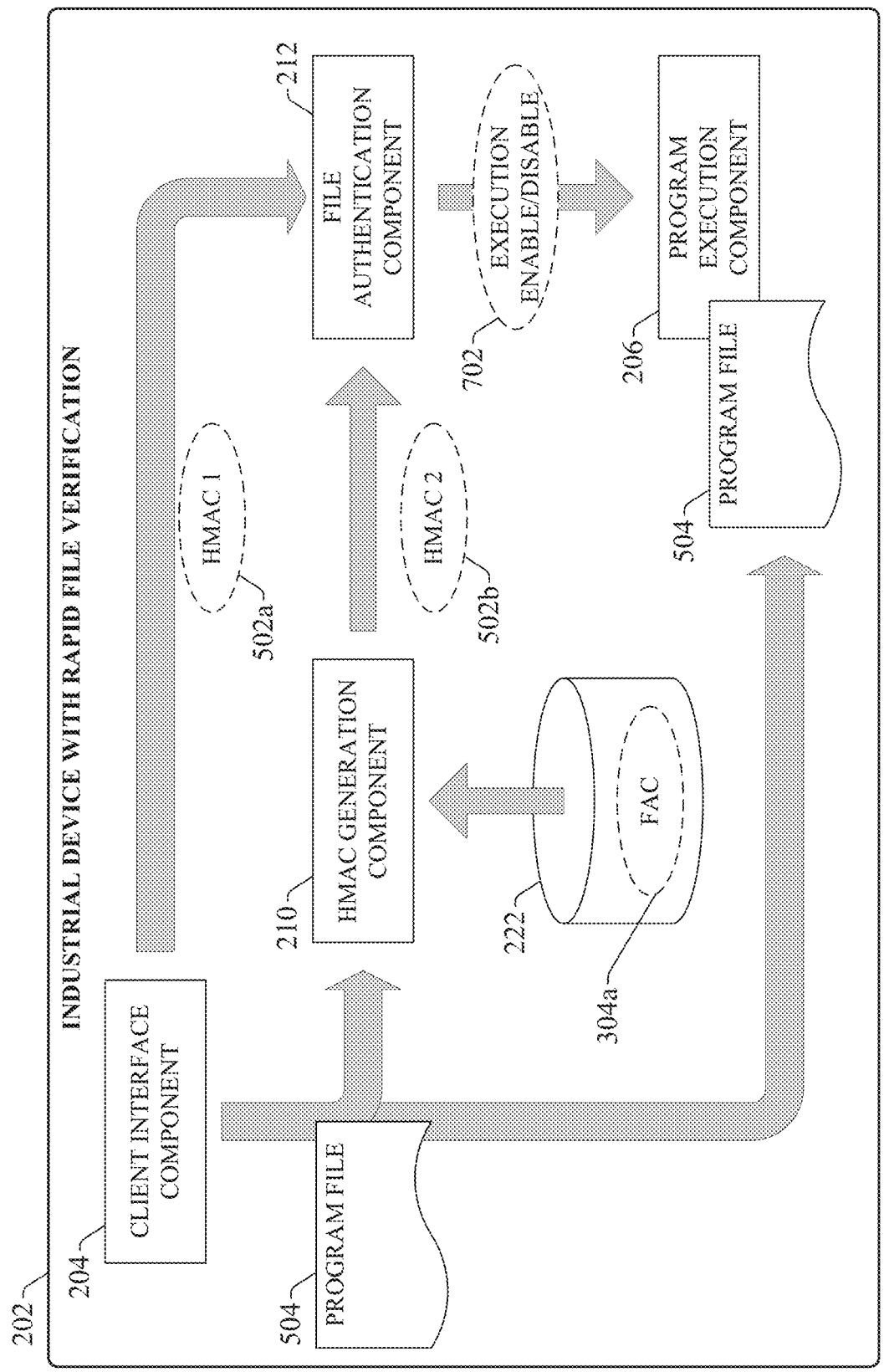
FIG. 7 is a diagram illustrating authentication of the received program file by the industrial device.

FIG. 7 is a diagram illustrating authentication of the received program file by the industrial device 202. When program file 504 and its bundled HMAC 502a (HMAC 1) is received by the industrial device 202, the industrial device's HMAC generation component 210 generates a second HMAC 502b (HMAC 2) using the received program file 504 and its own locally stored copy of the FAC 304a. Since the locally stored copy of the FAC 304a is identical to the copy of the FAC 304b provided to the client device 404 and used to generate the first HMAC 502a, the second HMAC 6502b will be identical to the received first HMAC 502a. File authentication component 212 then compares the first HMAC 502a with the second HMAC 502b, and if the two HMACs 502a and 502b are determined to be identical, indicating the program file 504 was created using the correct FAC 304a, file authentication component 212 sets an execution permissive 702 permitting the industrial device's program execution component 206 to execute the program file 504. Alternatively, if file authentication component 212 determines that the two HMACs 502a and 502b do not match, or if no HMAC was received with the program file 504, file authentication component 212 sets the execution permissive 702 to prevent execution of the program file 504 by the program execution component 206.

Some embodiments of industrial device 202 may be configured to bypass HMAC verification in certain circumstances. For example, some embodiments may allow a user to temporarily disable HMAC verification by delivering a disable instruction via a direct connection to the industrial device 202. This may be appropriate, for example, if the user intends to download a copy of an authorized program file to multiple industrial devices 202. In such circumstances, disabling HMAC verification allows the program file to be downloaded to the multiple devices 202 without the need to separately obtain an FAC from each device in order to generate separate device-specific HMACs for each instance of the program file. In other embodiments, industrial device 202 may be configured to automatically bypass HMAC verification for all cases in which a program file is downloaded via a local data or memory port, while only performing HMAC verification if the program file is received via the industrial device's network port.

The program file verification technique described herein reduces the risk of a malicious party substituting a compromised program file or other type of mobile code on an industrial device. The technique employs a lightweight program verification routine that consumes fewer computational resources relative to other authentication techniques (such as PKI-based validation). By limiting distribution of FACs only to client devices that are connected locally, embodiments of industrial device 202 can ensure that only plant personnel who are permitted to physically access the industrial device 202 are provided with credentials to create, edit, and download program files that will be executed on the industrial device.

Figure 8A:
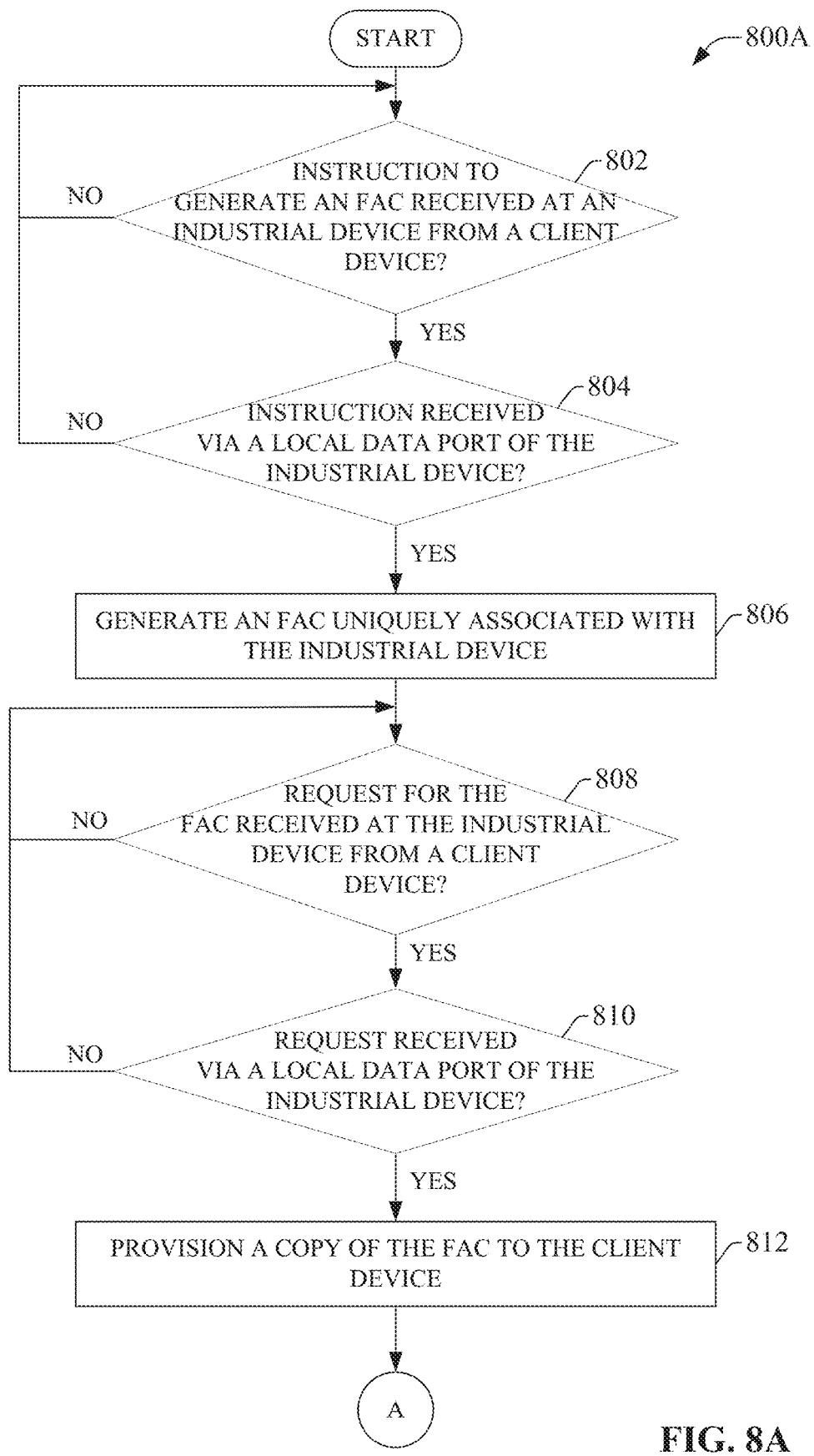
FIG. 8A is a flowchart of a first part of an example methodology for verifying an authenticity of an industrial control program installed on an industrial device.
Figure 8B:
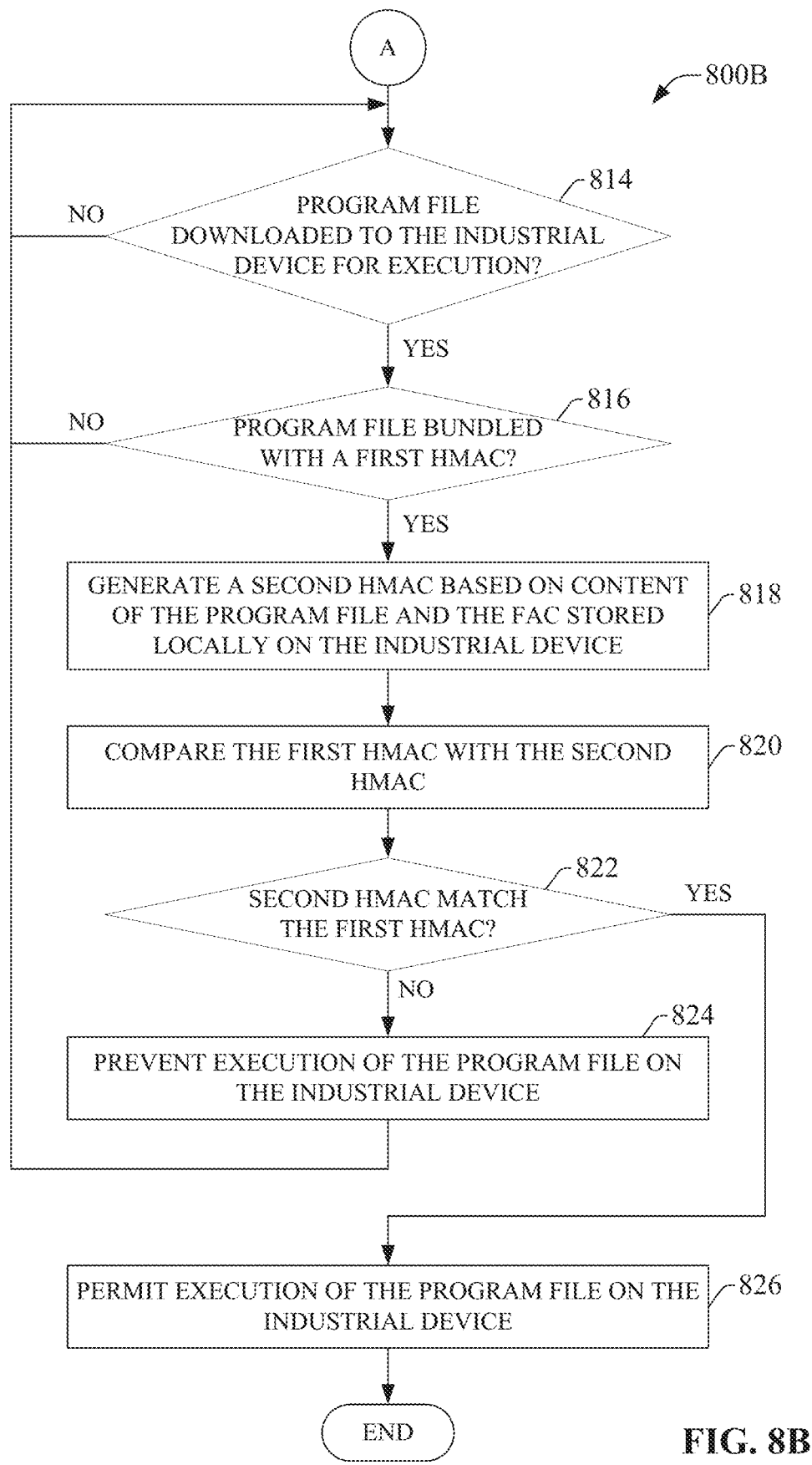
FIG. 8B is a flowchart of a second part of the example methodology for verifying an authenticity of an industrial control program installed on an industrial device.

FIGS. 8A-8B illustrate an example methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8A illustrates a first part of an example methodology 800A for verifying an authenticity of an industrial control program installed on an industrial device. The example methodology can be implemented, for example, on an industrial device, such as an industrial controller, a motor drive, an HMI terminal, or other such device in order to verify an authenticity of executable code provided to the device before allowing execution of the code. The executable code may be in the form of a program file or other type of mobile code that is executable by the industrial device to facilitate monitoring and/or control of an industrial process. Example program files can include, but are not limited to, industrial controller program files (e.g., a ladder logic program, a sequential function chart program, etc.), an HMI application file, or other such industrial mobile code.

Initially, at 802, a determination is made as to whether an instruction to generate an FAC is received at the industrial device from a client device. When such an instruction is received (YES at step 802), the methodology proceeds to step 804, where a subsequent determination is made as to whether the instruction was received via a local data port of the industrial device (e.g., a USB port, a serial port, a memory card slot, etc.). If the instruction was not received via a local data port (NO at step 804)—that is, if the instruction was received via a networking port of the industrial device—the methodology returns to step 802 without acting upon the instruction. Alternatively, if the instruction was received via a local port (YES at step 804), the methodology proceeds to step 806, where an FAC is generated in accordance with the instruction. The FAC is uniquely associated with the industrial device and may be generated based on a unique identifier associated with the industrial device (e.g., a MAC address or other such identifier).

At 808, a determination is made as to whether a request for a copy of the FAC is received at the industrial device from a client device (either the same client device that provided the instruction at step 802 or another client device). When such a request is received (YES at step 808), the methodology proceeds to step 810, where a determination is made as to whether the request was received via a local data port of the industrial device. If the request was not received via a local data port (NO at step 810)—that is, if the request was received via a networking port of the industrial device—the methodology returns to step 808 and awaits another request for the FAC without provisioning the FAC to the client device. Alternatively, if the request was received via a local data port (YES at step 810), the methodology proceeds to step 812, where the industrial device provisions a copy of the FAC to the client device from which the request was received.

The methodology proceeds with the second part 800B illustrated in FIG. 8B. At 814, a determination is made as to whether a program file has been downloaded to the industrial device for execution. When a program file has been downloaded (YES at step 814), the methodology proceeds to step 816, where a determination is made as to whether the program file includes a bundled first HMAC. If no HMAC is included with the program file (NO at step 816), the methodology returns to step 814 and the program file is not permitted to execute on the industrial device. Alternatively, if the program file includes an HMAC (YES at step 816), the methodology proceeds to step 818, where a second HMAC is generated by the industrial device based on content of the program file received at step 814 and the FAC that is locally stored on the industrial device (generated at step 806). At 820, the first HMAC received with the program file is compared with the second HMAC generated by the industrial device at step 818.

At 822, a determination is made as to whether the second HMAC matches the first HMAC based on the comparison made at step 820. If the second HMAC does not match the first HMAC (NO at step 822), the methodology proceeds to step 824, where execution of the program file is prevented by the industrial device. The methodology then returns to step 814 and awaits receipt of another program file. Alternatively, if the second HMAC matches the first HMAC (YES at step 822), the methodology proceeds to step 826, where execution of the program file on the industrial device is permitted by the industrial control program.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, motor drives, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC, PLC simulator, industrial controller, industrial controller simulator, or automation controller as used herein can include functionality that can be shared across multiple components, systems, and/or networks. As an example, one or more PLCs, PLC simulators, or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC, PLC simulator, industrial controller, or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as common industrial protocol (CIP) networks including DeviceNet, ControlNet, and EtherNet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 9:
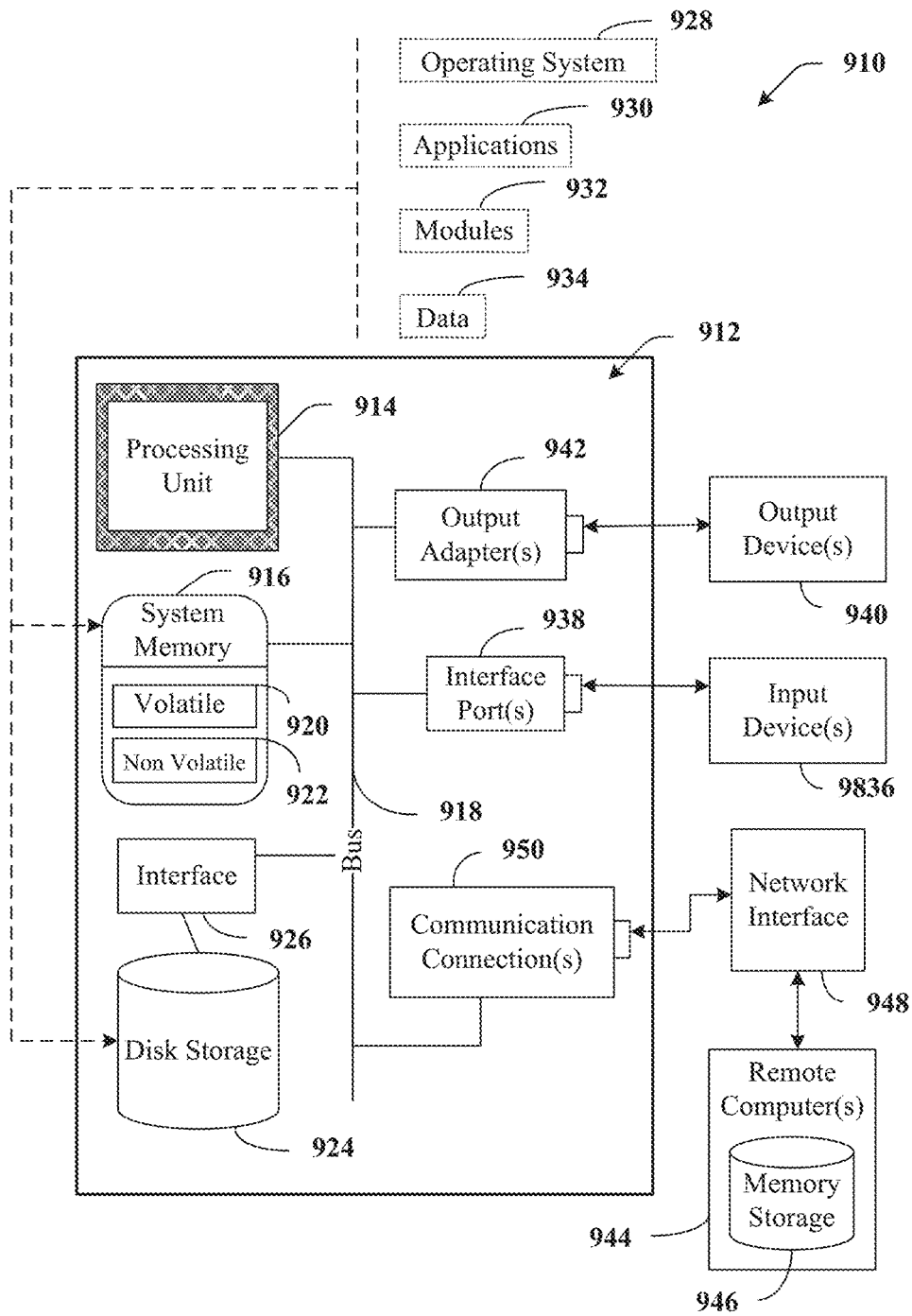
FIG. 9 is an example computing environment.
Figure 10:
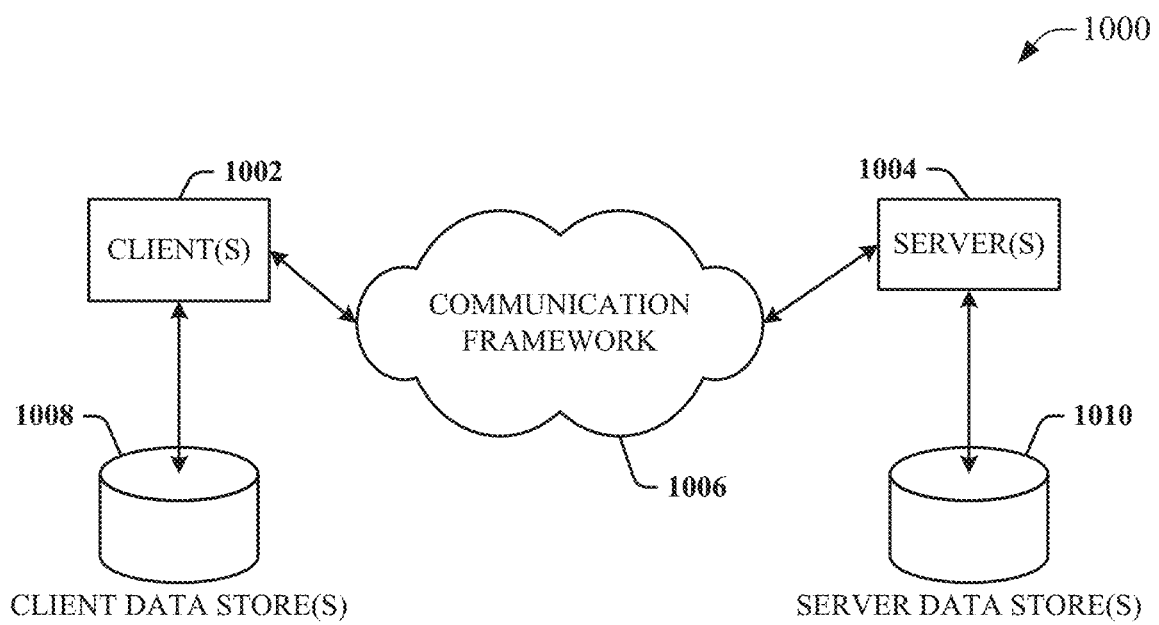
FIG. 10 is an example networking environment.

In order to provide a context for the various aspects of the disclosed subject matter, FIGS. 9 and 10 as well as the following discussion are intended to provide a brief, general description of a suitable environment in which the various aspects of the disclosed subject matter may be implemented.

With reference to FIG. 9, an example environment 910 for implementing various aspects of the aforementioned subject matter includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable PROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

FIG. 9 describes software that acts as an intermediary between users and the basic computer resources described in suitable operating environment 910. In some implementations, such software can include an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems, combinations of operating systems, or no operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like.

These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 948 can also encompass near field communication (NFC), Wi-Fi, or Bluetooth communication.

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial device, comprising:
   memory that stores executable components; and
   one or more processors, operatively coupled to the memory, that execute the executable components, the executable components comprising:
   a program execution component configured to execute mobile code, wherein execution of the mobile code facilitates at least one of monitor or control of an industrial process by the industrial device;

a file authentication code (FAC) generation component configured to generate an FAC that is specific to the industrial device;

a client interface component configured to, in response to determining that a request for a copy of the FAC is received from a client device via at least one of a local data port or a local memory port of the industrial device, send the copy of the FAC to the client device, and in response to determining that the request is received via a networking port of the industrial device, deny the request for the copy of the FAC;

an HMAC generation component configured to, in response to receipt of first received mobile code via the networking port, generate a first hash-based message authentication code (HMAC) based on the FAC and content of the first received mobile code, and in response to receipt of second received mobile code via at least one of the local data port or the local memory port, bypass generation of the first HMAC; and a file authentication component configured to prevent execution of the first received mobile code by the program execution component in response to at least one of a determination that a second HMAC bundled with the first received mobile code does not match the first HMAC or a determination that the first received mobile code does not include the second HMAC, and to permit execution of the second received mobile code by the program execution component in response to a determination that the second received mobile code is received via at least one of the local data port or the local memory port.

2. The industrial device of claim 1, wherein the first received mobile code or the second received mobile code is at least one of an industrial controller program file, a human-machine interface application file, or a motor drive configuration file.

3. The industrial device of claim 1, wherein the FAC generation component is configured to generate the FAC in response to an instruction to create the FAC received via at least one of the local data port or the local memory port of the industrial device, and to deny generation of the FAC in response to an instruction to create the FAC received via the networking port of the industrial device.

4. The industrial device of claim 1, wherein the FAC generation component is configured to generate the FAC based on at least one of a unique identifier associated with the industrial device or an authentication credential received as part of a request to generate the FAC.

5. The industrial device of claim 4, wherein the unique identifier is a media access control address of the industrial device.

6. The industrial device of claim 1, wherein the industrial device is at least one of an industrial controller, a human-machine interface terminal, or a motor drive.

7. The industrial device of claim 1, wherein the second HMAC bundled with the first received mobile code is generated by a development application used to create the first received mobile code based on the copy of the FAC and the content of the first received mobile code.

8. The industrial device of claim 1, wherein the FAC generation component is configured to send the copy of the FAC to the client device further in response to verifying user credential data received via the client interface component.

9. The industrial device of claim 1, wherein the file authentication component is further configured to permit execution of the first received mobile code in response to a determination that the second HMAC bundled with the first received mobile code matches the first HMAC.

10. A method for preventing execution of malicious code on an industrial device, comprising:

generating, by an industrial device comprising a processor and configured to communicate over a network, a file authentication code (FAC) that is unique to the industrial device;

in response to receiving a request for a copy of the FAC from a first client device, sending, by the industrial device, the copy of the FAC to the first client device conditional on a determination that the request is received via at least one of a local data port or a local memory port of the industrial device;

receiving, by the industrial device, mobile code from the first client device or a second client device;

in response to the receiving the mobile code and a determination that the mobile code is received via the network;

generating, by the industrial device, a first hash-based message authentication code (HMAC) based on the FAC and content of the mobile code, and in response to determining that a second HMAC received with the mobile code does not correspond to the first HMAC or that the mobile code was received without the second HMAC, preventing, by the industrial device, execution of the mobile code on the industrial device; and in response to the receiving the mobile code and a determination that the mobile code is received via at least one of the local data port or the local memory port, permitting execution of the mobile code on the industrial device without performing the generating of the first HMAC.

11. The method of claim 10, wherein the receiving the mobile code comprises receiving at least one of an industrial controller program file, a human-machine interface application file, or a motor drive configuration file.

12. The method of claim 10, wherein the generating the FAC comprises generating the FAC in response to an instruction to create the FAC received at the industrial device and conditional on a determination that the instruction is received via at least one of the local data port or the local memory port of the industrial device.

13. The method of claim 10, wherein the generating the FAC comprises generating the FAC based on a unique identifier associated with the industrial device.

14. The method of claim 10, wherein the sending the copy of the FAC is further conditional on verification of user credential data received at the industrial device in association with the request for the copy of the FAC.

15. The method of claim 10, wherein the mobile code is first mobile code, and the method further comprises:

receiving, by the industrial device, second mobile code from the first client device or the second client device;

in response to the receiving the second mobile code, generating, by the industrial device, a third HMAC based on the FAC and content of the second mobile code; and permitting, by the industrial device, execution of the second mobile code in response to determining that a fourth HMAC received with the second mobile code matches the third HMAC.

16. The method of claim 10, wherein the mobile code is first mobile code, and the method further comprises:
- receiving, by the industrial device, second mobile code from the first client device or the second client device; and
- permitting, by the industrial device, execution of the second mobile code in response to determining that the second mobile code is received via at least one of the local data port or the local memory port of the industrial device.

17. A non-transitory computer-readable medium having stored thereon executable instructions that, in response to execution, cause an industrial device comprising at least one processor to perform operations, the operations comprising:
- generating a file authentication code (FAC) that is specific to the industrial device;
- in response to determining that a request for a copy of the FAC is received from a first client device via at least one of a local data port or a local memory port of the industrial device, sending the copy of the FAC to the first client device;
- receiving mobile code from the first client device or a second client device;
- in response to determining that the mobile code is received via the local data port or the local memory port, enabling execution of the mobile code on the industrial device; and
- in response to determining that the mobile code is received via a network port of the industrial device;
  - generating a first hash-based message authentication code (HMAC) based on the FAC and content of the mobile code, and
  - in response to determining that a second HMAC included with the mobile code is not equal to the first HMAC or that the mobile code was received without the second HMAC, disabling execution of the mobile code on the industrial device.

18. The non-transitory computer-readable medium of claim 17, wherein the receiving the mobile code comprises receiving at least one of an industrial controller program file, a human-machine interface application file, or a motor drive configuration file.

19. The non-transitory computer-readable medium of claim 17, wherein the generating the FAC comprises generating the FAC in response to
- receipt of an instruction to create the FAC received at the industrial device, and
- a determination that the instruction is received via at least one of the local data port or the local memory port of the industrial device.

20. The non-transitory computer-readable medium of claim 17, wherein the generating the FAC comprises generating the FAC based on a unique identifier associated with the industrial device.

* * * * *